(12) United States Patent
Tuel, Jr. et al.

(10) Patent No.: US 6,934,950 B1
(45) Date of Patent: Aug. 23, 2005

(54) THREAD DISPATCHER FOR MULTI-THREADED COMMUNICATION LIBRARY

(75) Inventors: William G. Tuel, Jr., Kingston, NY (US); Rama K. Govindaraju, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 09/588,492

(22) Filed: Jun. 6, 2000

(51) Int. Cl.[7] .............................................. G06F 9/46
(52) U.S. Cl. ....................... 718/102; 718/100; 709/206
(58) Field of Search ................................. 718/100, 101, 718/102, 103, 104, 105, 107; 709/206

(56) References Cited

U.S. PATENT DOCUMENTS

| | | | |
|---|---|---|---|
| 5,548,760 A | 8/1996 | Healey ........................ | 395/650 |
| 5,560,029 A | 9/1996 | Papadopoulos et al. ..... | 395/800 |
| 5,710,923 A | 1/1998 | Jennings et al. ............ | 395/680 |
| 5,758,184 A | 5/1998 | Lucovsky et al. .......... | 395/826 |
| 5,784,615 A | 7/1998 | Lipe et al. .................. | 395/681 |
| 6,457,064 B1 * | 9/2002 | Huff et al. .................. | 719/318 |

OTHER PUBLICATIONS

UNIX Internals, The Newt frontiers, 1996.*
IBM Technical Disclosure Bulletin, "Multi-Thread Sequencing in Small Computer System Interface Environment", vol. 37, No. 09, Sep. 1994, pp. 497499.

IBM Technical Disclosure Bulletin, "Parallelized Management of Advanced Program-to-Program Communications/VM in a Server Superstructure," vol. 38, No. 02, Feb. 1995, pp. 319-320.
"IBM Parallel Environment for AIX—MPI Programming and Subroutine Reference" Ver 2 Rel 4, Oct., 1998.

* cited by examiner

*Primary Examiner*—Majid Banankhah
(74) *Attorney, Agent, or Firm*—Lawrence D. Cutter; Floyd A. Gonzalez

(57) ABSTRACT

Method, computer program product, and apparatus for efficiently dispatching threads in a multi-threaded communication library which become runnable by completion of an event. Each thread has a thread-specific structure containing a "ready flag" and a POSIX thread condition variable unique to that thread. Each message is assigned a "handle". When a thread waits for a message, thread-specific structure is attached to the message handle being waited on, and the thread is enqueued, waiting for its condition variable to be signaled. When a message completes, the message matching logic sets the ready flag to READY, and causes the queue to be examined. The queue manager scans the queue of waiting threads, and sends a thread awakening condition signal to one of the threads with its ready flag set to READY. The queue manager can implement any desired policy, including First-In-First-Out (FIFO), Last-In-First-Out (LIFO), or some other thread priority scheduling policy. This ensures that the thread which is awakened has the highest priority message to be processed, and enhances the efficiency of message delivery. The priority of the message to be processed is computed based on the overall state of the communication subsystem.

48 Claims, 6 Drawing Sheets

MESSAGE HANDLE STRUCTURE

THREAD DISPATCHER FOR MULTI-THREADED COMMUNICATION LIBRARY

This invention relates to thread dispatching in a multi-threaded communication library, and more particularly relates to efficient dispatching of threads which become runnable by completion of communication events. The choice of which thread to dispatch is based on the state of the message passing system to allow for maximum efficiency of the communication infrastructure.

BACKGROUND OF THE INVENTION

In order to better understand the background of the subject invention, explanation of certain terminology is first provided. A term well-known in the art as a symmetric multi-processor (SMP) refers to an aspect of hardware in a computing system and, more particularly, relates to the physical layout and design of the processor planar itself. Such multiple processor units have, as one characteristic, the sharing of global memory as well as equal access to I/O of the SMP system.

Another term which is commonly associated with modern complex computing systems is a "thread." The term "thread" in a general sense refers merely to a simple execution path through application software and the kernel of an operating system executing with the computer. As is well understood in the art, it is commonplace for multiple such threads to be allowed per a single process image. All threads of a process share the same address space which allows for efficient communication and synchronization among the various threads of execution in the process.

A thread standard has now been incorporated into the POSIX standard (1003c.1). Basic thread management under the POSIX standard is described, for example, in a publication by K. Robbins and S. Robbins entitled *Practical UNIX Programming—A Guide To Concurrency, Communication and Multi-threading*, Prentice Hall PTR (1996).

Another concept which is utilized hereinafter in describing the invention is one of "thread locks" or "mutexes." It is typical in modern computing systems to include critical sections of code or shared data structures whose integrity is extremely important to the correct operation of the system. Locks/mutexes are, in general, devices employed in software (or hardware) to "serialize" access to these critical sections of code and/or shared data structures.

Two types of locks are often encountered in the art, namely blocking locks and simple or "spin" locks. Blocking locks are of the form which cause a thread requesting the lock to cease being runnable, e.g., to go to "sleep" as the term is employed in the art, if the lock is currently held by another thread. Spin locks, in contrast, do not put waiting threads to "sleep", but rather, the waiting threads execute a spin loop, and thus repeatedly continue to request the lock until it is freed by the current thread "owner." Spin locks therefore continue to consume CPU cycles if the lock the thread is waiting for is owned by a different thread. Blocking locks are typically used for large critical sections of code or if the operating system kernel must differentiate between threads requiring data structure read-only capability and threads requiring the capability to modify the data structure(s).

One other term to note is the concept of code being multithread-safe. Code is considered to be thread/MP-safe if multiple execution threads contending for the same resource or routine are serialized such that data integrity is insured for all threads. One way of effecting this is by means of the aforementioned locks.

Presently, thread locking employs standard POSIX mutex functions. These standard POSIX functions include thread_mutex_lock and thread_mutex_unlock which are described, for example, in the above-referenced publication by K. Robbins & S. Robbins entitled *Practical UNIX Programming—A Guide to Concurrency, Communication and Multi-threading*. These functions are designed to enhance portability of applications running on several operating systems.

A communication library is a set of functions by which processes (tasks) can send, receive, and wait for messages to/from each other. A typical communication library provides means for a receiver of a message to discriminate among possible messages that have been sent. This is often called "message matching logic."

In a multi-threaded communication library, multiple threads can be waiting for messages to be received from other tasks. In prior versions of the MPI library available from IBM, when a message was received, the first thread to be waiting was notified of a waiting message. It awoke and checked to see if the message was for it. If not, it awakened the next waiting thread, and so on, until the thread waiting for the specific message was awakened. The extra work in awakening threads which have no work to do creates inefficiency.

PARALLELIZED MANAGEMENT OF ADVANCED PROGRAM-TO-PROGRAM COMMUNICATIONS/VM IN A SERVER SUPERSTRUCTURE, IBM Technical Disclosure Bulletin, Vol. 38, No. 02, February 1995, PP 319–320, discloses running multiple threads, each thread being dispatched to handle an incoming message, the number of threads being dependent on the message rate. All threads are equivalent, and there is no binding of messages to threads.

MULTI-THREAD SEQUENCING IN A SMALL COMPUTER SYSTEM INTERFACE ENVIRONMENT, IBM Technical Disclosure Bulletin, Vol. 37, No. 09, September 1994, PP 497–499, discloses a technique for properly sequencing commands to a multi-threaded hardware device by annotating each command with a word which indicates which other thread must complete before this thread can start. In this way, a properly ordered queue of commands can be maintained.

U.S. Pat. No. 5,560,029 issued Sep. 24, 1996 to Papadopoulos et al. for DATA PROCESSING SYSTEM WITH SYNCHRONIZATION COPROCESSOR FOR MULTIPLE THREADS, discloses a distributed data flow computer, in which the threads are the sequences of machine instructions which are queued and assigned to any available machine processor without distinction. The patent focuses especially on handling reads of remote memory, in which a thread's next instruction is not queued until the remote memory request is satisfied. This enqueuing is done by hardware, and not assigned to any specific processor.

U.S. Pat. No. 5,784,615 issued Jul. 21, 1998 to Lipe et al. for COMPUTER SYSTEM MESSAGING ARCHITECTURE, discloses a mechanism for passing messages between the various protection zones in the Windows 95 operating system. In the patent, "thread" is to be interpreted as sequence of machine instructions, and not the POSIX thread construct. The focus of the patent is on providing messaging services between secure and insecure domains of the operating system, by providing callback functions in the secure domain that can be invoked by a user in the insecure domain. There is no notion of thread synchronization or special dispatching techniques, other than a general mention of using a standard semaphore to allow two threads to cooperate.

U.S. Pat. No. 5,758,184 issued May 26, 1998 to Lucovsky et al. for SYSTEM FOR PERFORMING ASYNCHRONOUS FILE OPERATIONS REQUESTED BY RUNNABLE THREADS BY PROCESSING COMPLETION MESSAGES WITH DIFFERENT QUEUE THREAD AND CHECKING FOR COMPLETION BY RUNNABLE THREADS, discloses a technique for performing multiple simultaneous asynchronous input/output operations in a Computer Operating System. The focus of the patent is efficiently handling completion of I/O operations using threads.

U.S. Pat. No. 5,710,923 issued Jan. 20, 1998 to Jennings et al. for METHODS AND APPARATUS FOR EXCHANGING ACTIVE MESSAGES IN A PARALLEL PROCESSING COMPUTER SYSTEM, discloses a method for communicating active messages among nodes of a parallel processing computer system where an active message comprises a pointer to a function to be invoked at the target when the message arrives at the target with a few parameters from the message being passed to the function upon arrival.

U.S. Pat. No. 5,548,760 issued Aug. 20, 1996 to Healey for MESSAGE HANDLER, discloses a message handler for passing messages between processes in a single threaded operating system.

It is typical for a message passing library to provide a reliable transport mechanism for messages between tasks, a mechanism known in the art as "flow control" is incorporated. The flow control mechanism requires state to be maintained both at the sender and receiver of messages to ensure a reliable transport can occur. If messages are lost in transit they are retransmitted by the sender based on the state maintained. The flow control mechanism bounds the amount of state that needs to be maintained to guarantee the reliability of message delivery. The bounded state is also sometimes referred to in the art as the flow control window. The size of the window is referred to in the art as tokens. Tokens are used up when messages are sent and are freed when the receiver acknowledges them thus advancing the window. A critical design aspect for high performance message passing design systems is to ensure that the sending of messages and acknowledgments is tuned such that a sender is not blocked due to lack of tokens. In a multithreaded message passing system where several threads are waiting for messages to arrive and then send acknowledgments for freeing tokens, it is critical for the message passing system to be able to dispatch the thread that is most likely to minimize senders being blocked due to tokens. Efficient message passing systems therefore cannot simply rely on POSIX thread dispatch routines for efficient dispatch since the state to decide which thread to be dispatched for maximum efficiency is in the message passing system and not in POSIX utility functions.

Certain messages in multiprocessor message passing systems are more critical than others, for example, messages that typically deal with distributed lock manager in databases and file systems. It is more efficient to dispatch threads that process these performance critical messages before handling other messages. The ability to recognize certain messages as being more critical and dispatching the appropriate threads to process them is critical for efficient message passing systems.

The above examples show how state can be maintained efficiently in the message passing system to allow controlled thread dispatching for maximum efficiency. Our invention described in this disclosure details an efficient mechanism by which the messaging system can control the dispatching of messaging threads to enhance its performance.

SUMMARY OF THE INVENTION

In the present invention, each thread has a thread-specific structure containing a "ready flag" and a POSIX thread condition variable unique to that thread. Each message is assigned a "handle." When a thread waits for a message, a thread-specific structure is attached to the message handle being waited on, and the thread is enqueued, waiting for its condition variable to be signaled. When a message completes (i.e., arrives, is matched, and is copied into the user buffer), the message matching logic sets the ready flag to READY, and causes the queue to be examined. The queue manager scans the queue of waiting threads, and sends a thread awakening condition signal to one of the threads with its ready flag set to READY. The queue manager can implement any desired policy, including First-In-First-Out (FIFO), Last-In-First-Out (LIFO), or some other thread priority scheduling policy. This ensures that the thread which is awakened has the highest priority message to be processed, and enhances the efficiency of message delivery. The priority of the message to be processed is computed based on the overall design of the message passing library, and can include giving priority to flow control messages as described in the examples given above.

These and other objects will be apparent to one skilled in the art from the following drawings and detailed description of the invention.

DESCRIPTION OF THE PREFERRED EMBODIMENT

Figure 1:
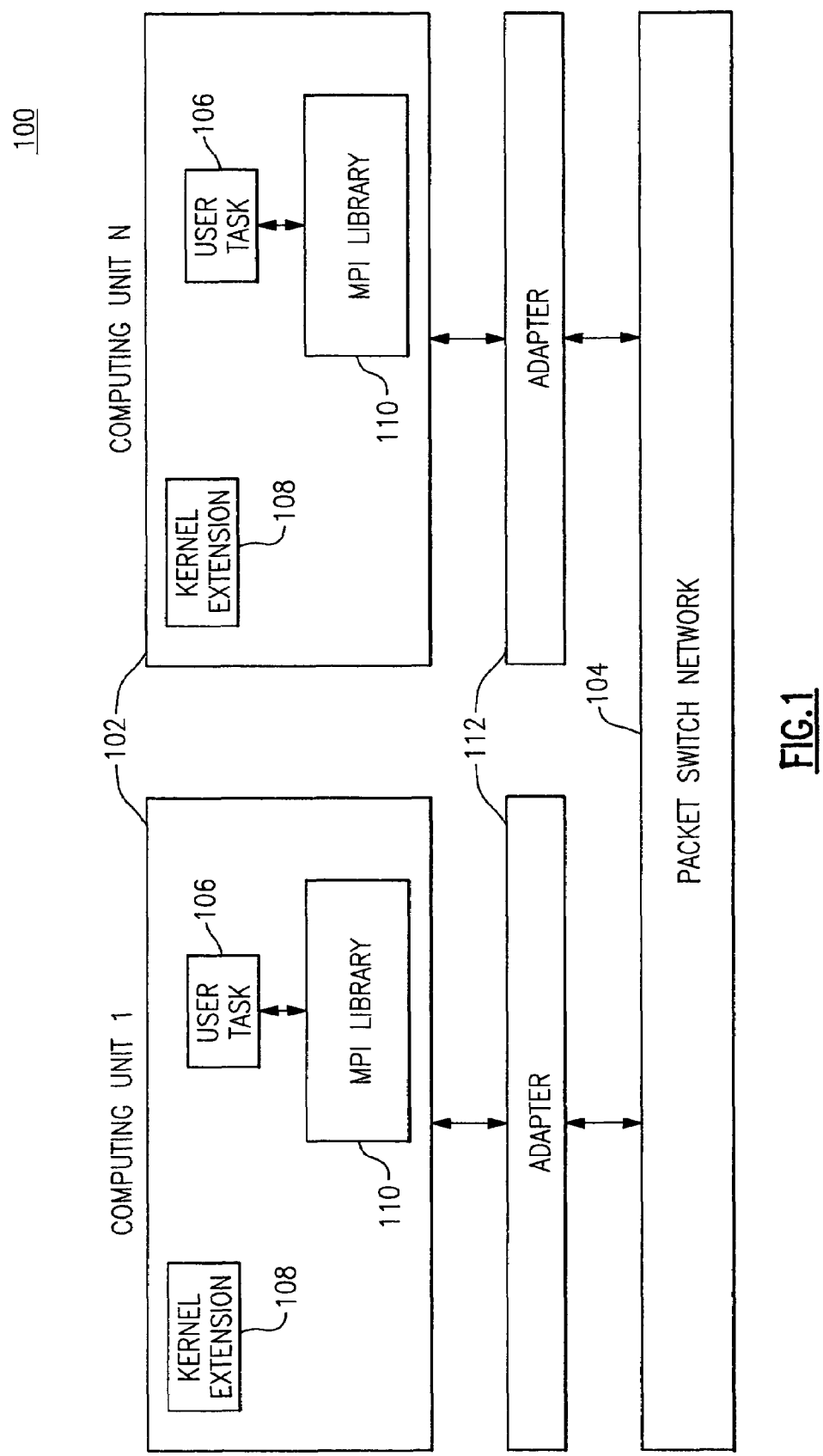
FIG. 1 depicts one example of a threaded computer environment usable with the present invention.

As shown in FIG. 1, a computer environment 100 includes a plurality of computing nodes 102 coupled to one another via a connection 104. As one example, each computing node may comprise a node of an RS/6000 SP System offered by International Business Machines Corporation, and connection 104 may be a packet switch network, such as the SP switch or high performance switch (HPS), also offered by International Business Machines Corporation. Note again, FIG. 1 is presented by way of example only. The techniques disclosed herein could apply to any serial program or any multithreaded program running on a single machine in addition to the multi-processor environment depicted in FIG. 1.

Within environment 100, message packets are passed from a source computing node (sender) to a receiver computing node (receiver) via packet switch network 104. For example, a user task 106 of computing unit N may pass a message to a user task 106 of computing unit 1 (receiver). Each user task can directly read data from and write data to an associated adapter 112, bypassing the overhead normally associated with having the operating system intervene in communication protocols. Adapter 112 couples computing unit 102 to switch 104. One example of switch 104 is described in detail in "IBM Parallel System Support Programs For AIX Administration Guide," Publication No. GC23-3897-02 (1996).

As further explanation, communication between a computing unit and its associated adapter 112 is, for instance, described by an interface that includes functions, such as, open communication, close communication, enable route, disable route, return status, and reset adapter. In one embodiment, the interface comprises a message passing interface (MPI) 110, also referred to herein as an MPI communication library. The MPI library comprises one example of a resource for which a lock mechanism in accordance with the present invention may be employed.

The MPI library is described in greater detail in, for example, an International Business Machines Corporation publication entitled "IBM Parallel Environment For AIX: MPI Programming and Subroutine Reference," Version 2, Release 4 (October, 1998), the entirety of which is hereby incorporated herein by reference.

International Business Machines Corporation's implementation of the MPI library is described in detail in various additional publications. For example, reference an article in the IBM Systems Journal entitled "The Communication Software In Parallel Environment Of The IBM SP2," Vol. 34, No. 2, pp. 205–215 (1995). Further information on communication libraries is available in a textbook by W. Richard Stevens entitled *UNIX Network Programming*, published by Prentice Hall, Inc. (1990). Both of these references are hereby incorporated by reference in their entirety.

As noted, it is assumed herein that the computing environment comprises a threaded computer environment so that the user task comprises a threaded user, and the library is a threaded MPI. A threaded computer environment is today well-known in the industry as one approach to implementing multi-node distributed processing. A threaded MPI library is available from International Business Machines Corporation as "IBM Parallel Environment For AIX," Version 2, Release 4, IBM Product No. 7565-543 (October, 1998). This threaded MPI comprises a licensed program product which runs on the AIX system. "AIX" is the IBM version of the UNIX operating system.

The system of FIG. 1 receives messages on multiple threads, and activates the correct thread to process the message. This is done by the MPI programs using the POSIX threads library, and particularly the implementation with the IBM Parallel Environment (PE) and Parallel System Support Program (PSSP) products.

Figure 2:
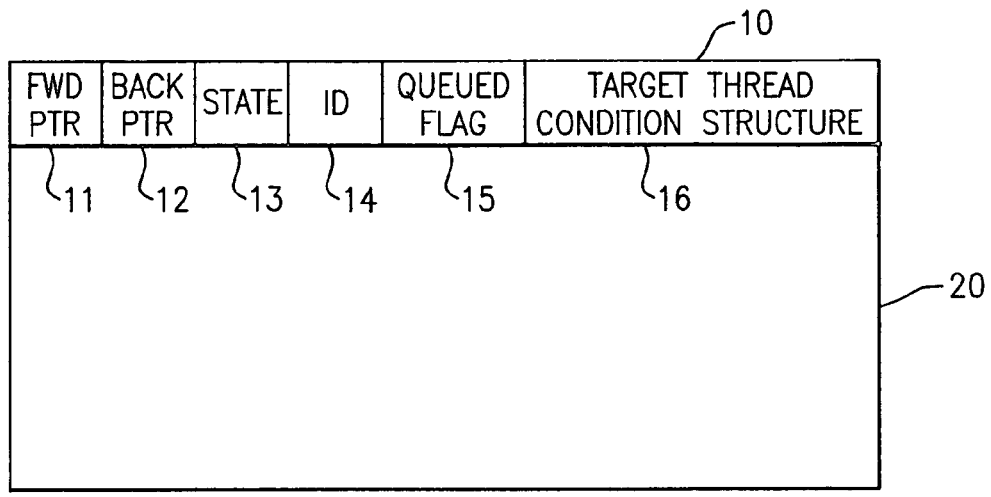
FIG. 2 is a representation of a queue for storing a plurality of Thread Queue Elements (TQE) therein.

As part of the invention, at the time a thread is created using standard POSIX calls, a block of storage specific to that thread, called a Thread Queue Element (TQE), is created. FIG. 2 is a representation of a TQE queue 20 storing such TQE's 10. The queue is represented by having the forward and back pointers contain addresses of other TQEs 10 in the queue. The TQE 10 has the following fields: Forward Pointer 11, Back Pointer 12, State 13, Identification (ID) 14, Queued flag 15, and Target Thread Condition structure 16. The Forward and Back Pointers 11 and 12 are used to maintain a queue of TQE's 10, using well-known linked-list processing techniques. The State 13 can be READY or WAITING. A TQE 10 that has State=READY can be dequeued at any time. A TQE 10 that has State=WAITING can only be dequeued if there are no TQE's 10 with State=READY. The Queued flag 15 is set to indicate whether the TQE 10 is part of a TQE queue 20, and the Target Thread Condition is a POSIX thread condition structure that can be waited on using the standard POSIX thread calls. The ID 14 is the POSIX thread ID used for additional user information. Initially, a TQE 10 is not enqueued in the queue 20, and has state=READY.

Figure 3:
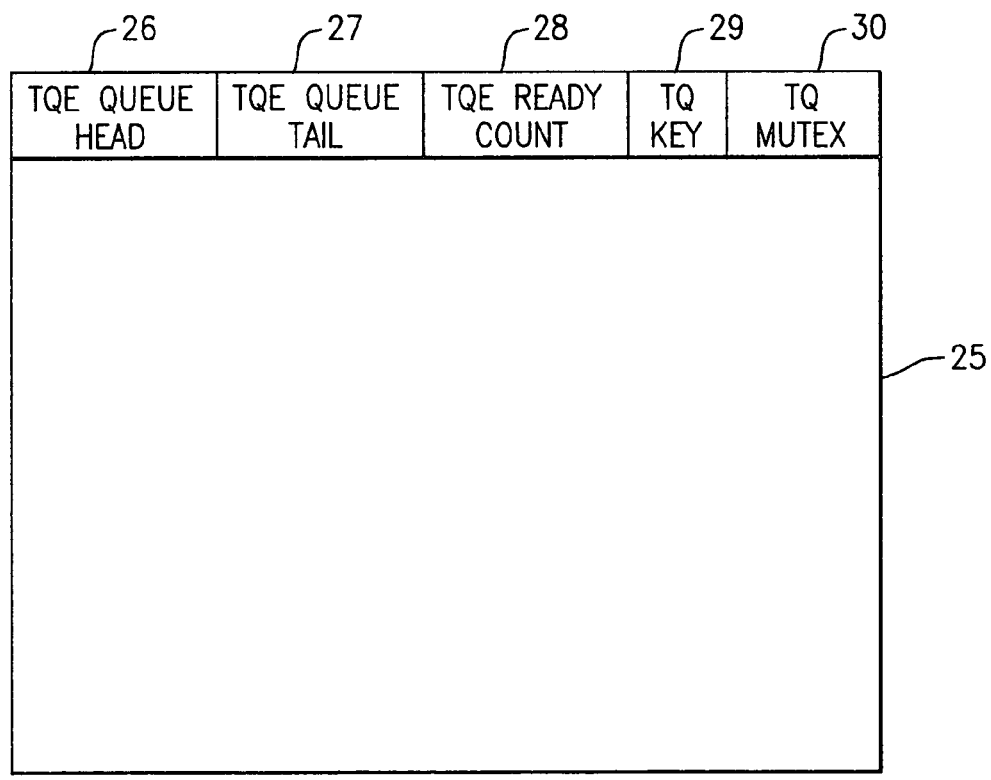
FIG. 3 is a representation of a base structure or Pipe-control containing information shared by all threads.

There is a TQE 10 for each message passing thread. In addition, there is a base structure 25 of FIG. 3, wherein the base structure is called the Pipe-control. The Pipe-control 25 has the following fields (which are accessible by and common to all threads); TQE_queue_head 26, TQE_queue_tail 27, TQE_ready_count 28, TQ_key 29, and TQ_mutex 30. The TQE_queue_head 26 and TQE_queue_tail 27 are pointers to the head and tail, respectively, of the TQE queue 20. The TQE_ready_count is the count of the number of TQE's in the TQE queue 20 with state=READY. The TQ_key 29 is a value used to obtain the TQE 10 for the currently-running thread, and is a well-known part of the thread-specific storage functionality of POSIX threads. The TQ_mutex is a POSIX mutex, used to serialize access to the pipe_control structure 25 and the TQE queue 20. Such serialization is required because the elements in Pipe-control 25 are accessed and modified by more than one thread.

Figure 4A:
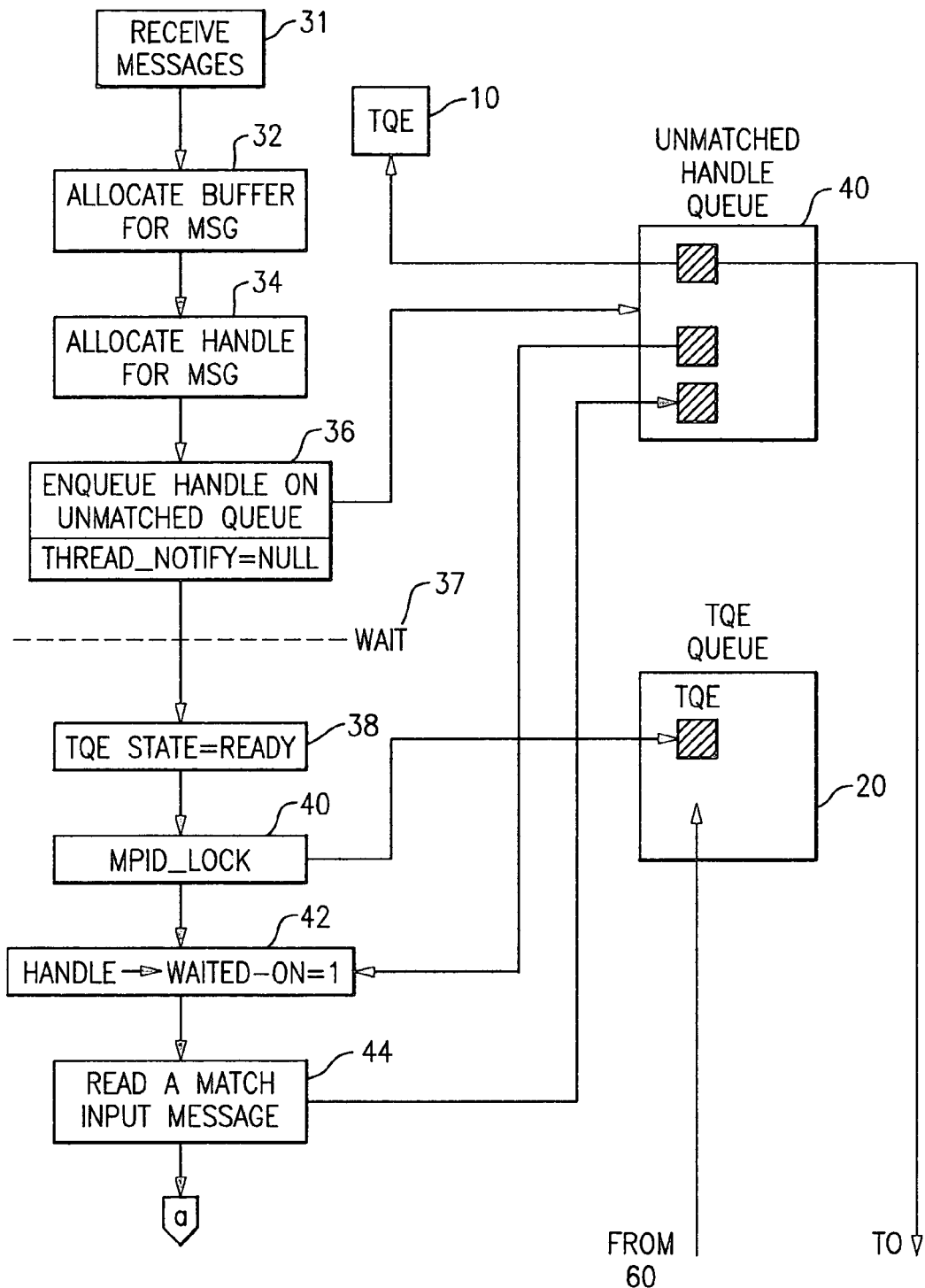
FIGS. 4A and 4B, joined by connectors a—a, form a flowchart of a program of the present invention for controlling multi-threaded communications.
Figure 4B:
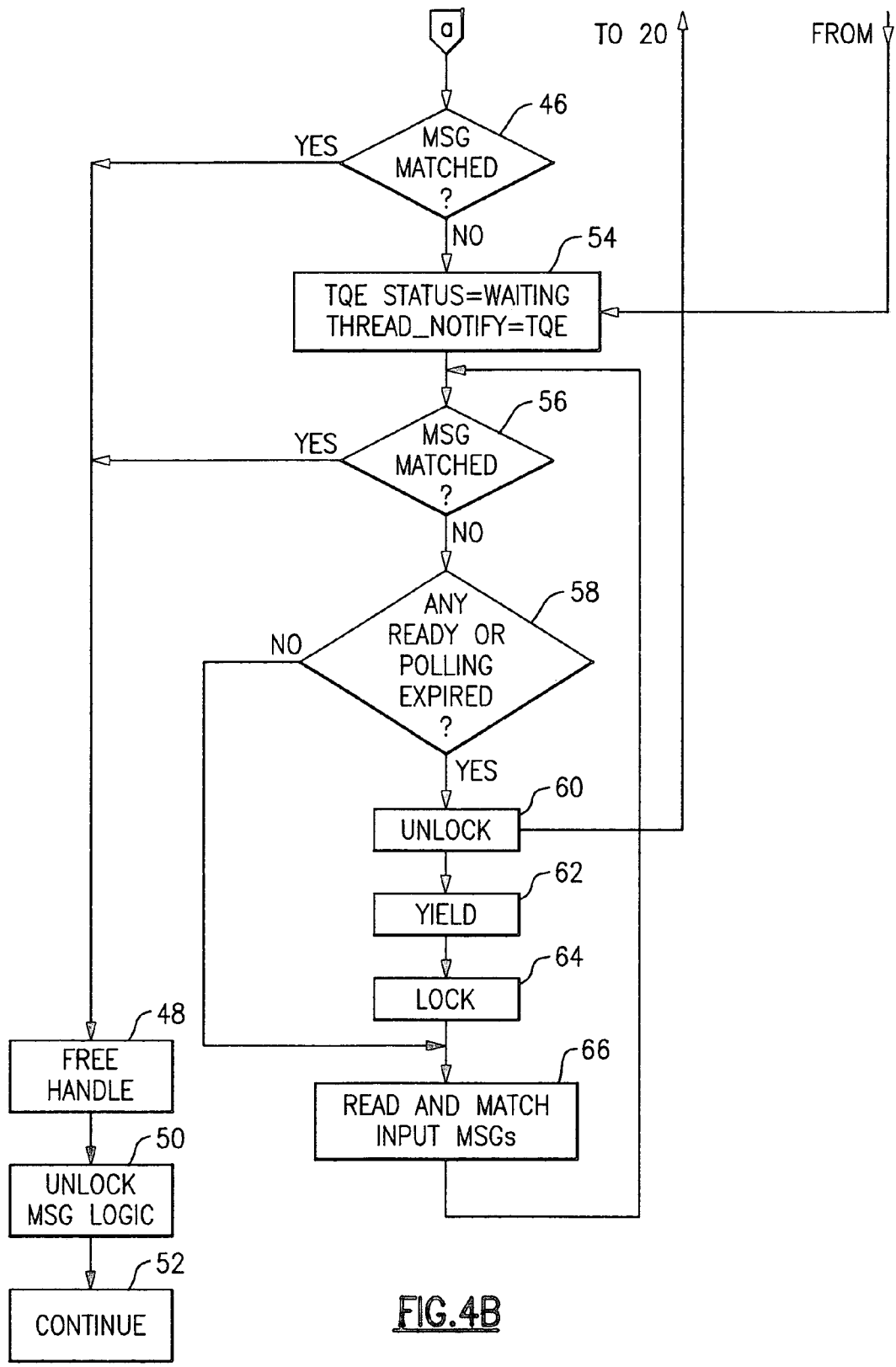
Figure 5:
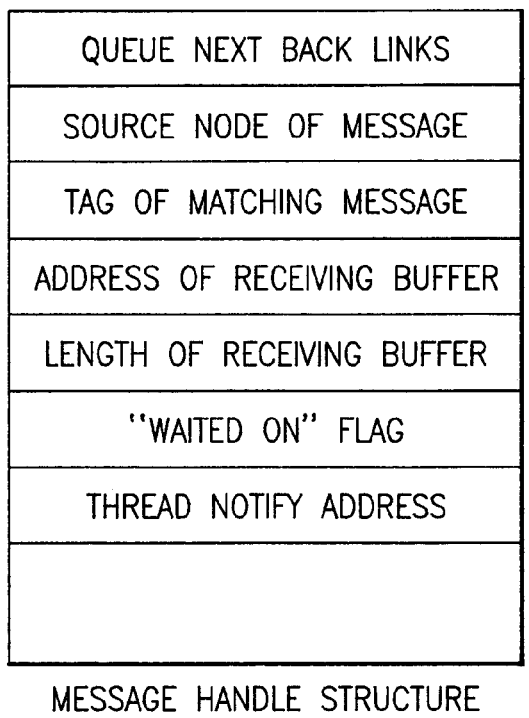
FIG. 5 is a representation of a message handle structure, with fields for message source, tag, buffer address, maximum length, a "waited on" flag, and a notify address.

FIGS. 4A and 4B, joined at connectors a—a, form a flowchart of the message processing logic of the present invention. At 31, a thread wants to receive a message and starts the program. At 32 a buffer large enough to contain the message being received is allocated. At 34, a handle is allocated for the message (FIG. 5). The handle contains information such as the buffer address, the match condition (to be discussed), whether the message has been "waited on," and the address of a TQE 10 to be "notified" when a message matching the match conditions has been received and copied into the buffer allocated at 32. Other than the TQE, this handle structure has been used by PSSP in all prior versions of the MPCI/MPI library. At 36, the handle is enqueued on an unmatched message queue 40. The list (or queue) 40 is a list of handles for which buffers have been allocated and match conditions posted, but a message satisfying these conditions has not yet been received. When the handle is enqueued in 40, the waited-on flag for that entry is set to 0, and the thread-notify TQE address for that entry is set to NULL, since at this point the user has not indicated a desire to wait for the message. At 37, the program waits for a message to be received.

At 37, a user decides to wait on a handle. That is, some thread will wait for a message to be received that matches the conditions listed in the particular handle passed by the message passing logic. The TQE 10 for that thread will be obtained (via the pipe_control 25 TQ_key 29) and the state 13 set to READY at 38. At 40, the thread gets access to the internal message passing logic via a call to MPID_lock, which returns when the thread "owns" the message passing lock. The lock/unlock process is fully discussed in the patent application for SYSTEM FOR RESOURCE LOCK/UNLOCK CAPABILITY IN MULTITHREADED COM- PUTER ENVIRONMENT by Govindaraju et al., Ser. No. 09/139,255 filed Aug. 25, 1998, incorporated herein by reference.

At 42, the handle waited-on flag is set to 1, meaning that the message is now being waited on. At 44, the internal message passing logic (routine) is called. This routine reads any incoming messages and tries to match them with the match conditions on all the handles in the unmatched queue. If a message matches, the data is copied into the user's buffer, and the thread-notify TQE address in the handle (if set), is used to identify the thread to be restarted; the state of the thread-notify TQE is set to READY, and the count of READY TQE's 28 is updated in the Pipe_control structure 25.

At 46 of FIG. 4B, when the internal message routine returns, the thread checks to see if the message it was waiting for was one of the messages that was matched. If yes, the handle is freed at 48, and unlocks the internal message passing logic at 50. The message reception is now complete, and the thread continues at 52 to do other work.

If at 46, the handle being waited on by this thread was not matched, then at 54, the thread will prepare to wait. It does this by setting the state=WAITING for its TQE, and putting the address of its TQE in the handle as the thread-notify address. At 56, a check is made to determine if the message handle for this thread is matched. It yes, the message is complete, the handle is freed at 48, the locked released at 50, and the thread continues on with other work at 52.

Figure 6:
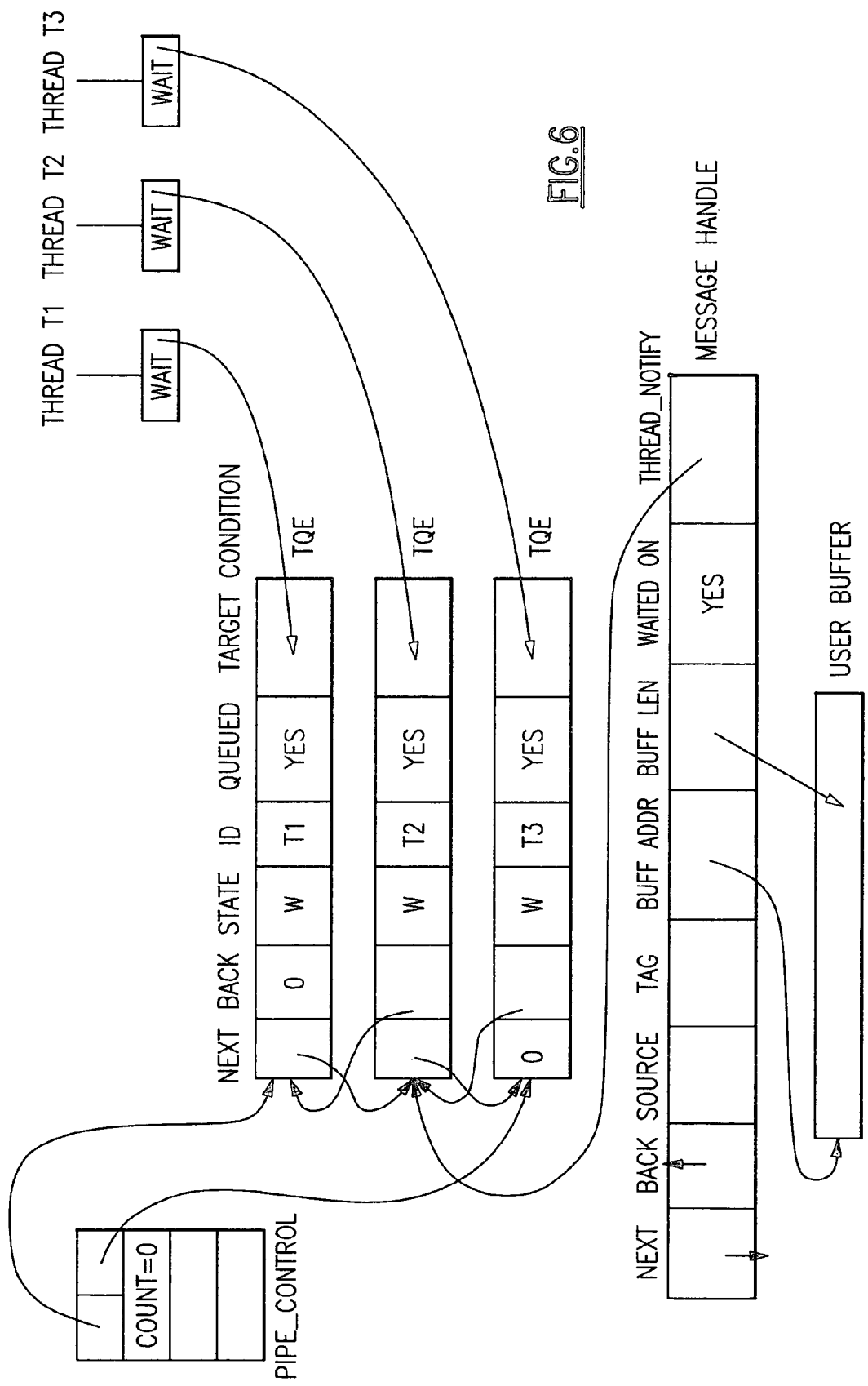
FIG. 6 illustrates the relationship of the elements of the invention at one point in the operation.

If the message handle is not matched at 56, a check is made at 58. At 58, the thread tests the Pipe_control TQ_ready count 28 to see if any threads are ready to run, or if its time slice has expired. Time slicing is well understood by those skilled in the art, and will not be discussed further. At 60, the thread calls MPID_unlock to unlock the internal message passing routine. This restarts the first READY TQE in the TQE queue 20 by sending a thread signal to its TQE target signal condition. At 62, the thread calls the system call "yield," allows any restarted threads to be assigned to a processor and do useful work. Once this thread has been given control back from the operating system, it calls MPID_lock at 64. MPID_lock causes the enqueueing of the TQE and waiting for a signal to its TQE thread signal condition (FIG. 6). Thus, this thread will not return from MPID_lock called at 64 until it has been signaled, and it doesn't get signaled until it is READY (i.e. has a message matched), (or until there are no READY TQE's). Thus, this thread will sleep until a message arrives that matches the conditions set, and will not be restarted prematurely, even if it was the first thread to wait for a message. Once this thread gets control back from MPID_lock, at 66 the thread will call the internal message passing routine to read messages and try to match them against any posted handle. The thread then loops back to 56, where it expects to find the message matched and thus finish via 48–52. The MPID_lock/unlock routines are as follows:

MPID_lock:
 a) get TQE element for this thread via Pipe_control TQ_key;
 b) lock the pipe_control.mutex lock;
 c) enqueue the TQE on the TQE thread queue using standard linked-list management for the forward and back pointers;
 d) while Pipe_control_owner=0, wait for the TQE Target signal condition. This is the point at which the thread will wait until a message arrives;
 e) claim lock ownership by setting Pipe_control_owner=TQE_id (14);
 f) dequeue the TQE, since it no longer is waiting for the lock; and
 g) unlock the Pipe_control_mutex lock.

MPID_unlock:
 a) lock the Pipe_control_mutex lock;
 b) search the TQE queue and find the first TQE with state=READY, (or the first element if there are no READY TQE's);
 B1) if the TQE element also contains a priority field, find the highest priority TQE with state=READY;
 c) send a thread condition signal to the Target contained in the TQE selected;
 d) relinquish lock ownership by setting Pipe_control_owner=0; and
 e) unlock the pipe_control.mutex lock.

Figure 7:
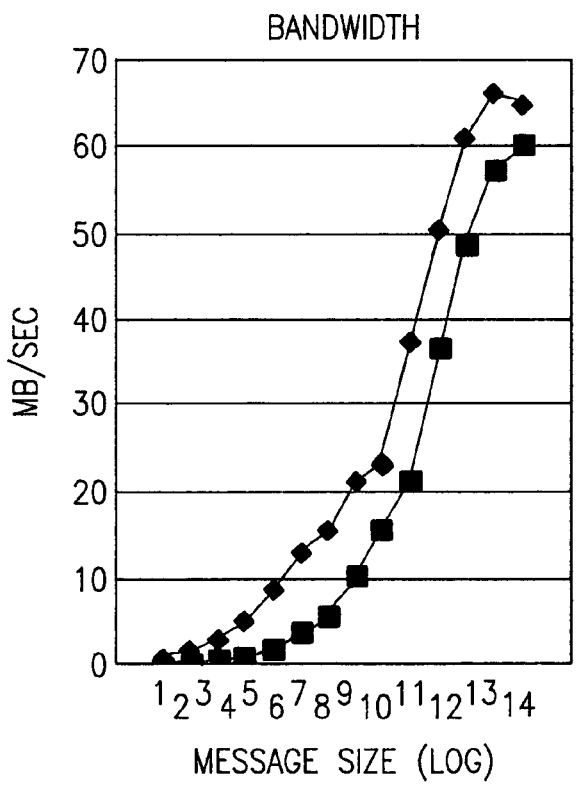
FIG. 7 is a graph showing the improved performance of multithread communications using the present invention over the method used under the prior art.

FIG. 7 is a graph showing the improved performance of multithread message communication using the present invention over the method used under the prior art. The prior art method is shown by curve 80, and the message multithread message communication of the present invention is shown at 82. It will be understood that the present method results in an increased bandwidth of about 100%.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for efficiently dispatching threads awaiting messages in a multi-threaded communication library comprising:
 preassigning threads to messages to be received;
 putting to sleep, those threads whose assigned messages have not been received;
 upon receipt of a message, awakening its preassigned thread; and
 executing said awakened thread which processes the received message and tests to see if any other threads are ready to run.

2. The method of claim 1 wherein the selection of the thread to be dispatched is based on its priority as set when the thread is put to sleep.

3. The method of claim 1 wherein said preassigning threads step comprises:
 creating a thread-specific structure for each thread, each thread-specific structure having a ready flag and a condition variable unique to its preassigned thread;
 creating a handle for each message to be received; and
 having a thread invoke message passing logic for a particular handle, thereby associating the thread and the message.

4. The method of claim 3 wherein said putting to sleep step comprises:
 enqueing for a received message, a preassigned thread-specific structure into a first queue;
 writing into said handle associated with the message received, an identification of said thread-specific structure enqued for the received message, and
 placing said thread-specific structure for the received message in the WAIT condition.

5. The method of claim 4 wherein said awakening step comprises;
 completing said received message;
 changing the condition of the thread-specific structure for the completed received structure to the READY condition; and dequeueing with a queue manager, the next thread-specific structure in said first queue in the READY condition and sending its thread a thread awakening condition signal.

6. The method of claim 5 further comprising;

allocating in said preassigning step, buffer space for storing messages to be received; and in said putting to sleep step, identifying in said handle the buffer in which the message associated with the handle is to be stored when it is received.

7. The method of claim 6 wherein said completing said received message comprises storing said received message in the buffer identified in the associated handle for the received message.

8. The method of claim 5 wherein said queue manager dequeues the next thread-specific structure using a First-In-First-Out policy.

9. The method of claim 5 wherein said queue manager dequeues the next thread-specific structure using a Last-In-First-Out policy.

10. The method of claim 5 wherein said queue manager dequeues the next thread-specific structure based on a priority value contained in said structure.

11. The method of claim 5 further comprising obtaining a lock for the handle associated with said received message such that the awakened thread may process only the received message.

12. The method of claim 11 further comprising releasing said lock after said awakened thread has processed said received message such that said awakened thread may continue with other work.

13. A computer program product comprising a computer useable medium having computer readable program code means therein for efficiently dispatching threads awaiting messages in a multi-threaded communication library, said computer readable program code means in said computer program product comprising:

computer readable program code means for preassigning threads to messages to be received;

computer readable program code means for putting to sleep, those threads whose assigned messages have not been received;

computer readable program code means for, upon receipt of a message, awakening its preassigned thread; and computer readable program code means for executing said awakened thread, processing the received message and testing to see if any other threads are ready to run.

14. The computer program product of claim 13 wherein the selection of the thread to be dispatched is based on its priority as set when the thread is put to sleep.

15. The computer program product of claim 13 wherein said computer readable program code means for preassigning threads comprises:

computer readable program code means for creating a thread-specific structure for each thread, each thread-specific structure having a ready flag and a condition variable unique to its preassigned thread;

computer readable program code means for creating a handle for each message to be received; and computer readable program code means for having a thread invoke message passing logic for a particular handle, thereby associating the thread and the message.

16. The computer program product of claim 15 wherein said computer readable program code means for putting to sleep comprises:

computer readable program code means for enqueing for a received message, a preassigned thread-specific structure into a first queue;

computer readable program code means for writing into said handle associated with the message received, an identification of said thread-specific structure enqued for the received message, and computer readable program code means for placing said thread-specific structure for the received message in the WAIT condition.

17. The computer program product of claim 16 wherein said computer readable program code means for awakening comprises;

computer readable program code means for completing said received message;

computer readable program code means for changing the condition of the thread-specific structure for the completed received structure to the READY condition; and computer readable program code means for dequeueing with a queue manager, the next thread-specific structure in said first queue in the READY condition and sending its thread a thread awakening condition signal.

18. The computer program product of claim 17 further comprising;

computer readable program code means for allocating in said preassigning step, buffer space for storing messages to be received; and said computer readable program code means for putting to sleep includes, computer readable program code means for identifying in said handle the buffer in which the message associated with the handle is to be stored when it is received.

19. The computer program product of claim 18 wherein said computer readable program code means for completing said received message comprises computer readable program code means for storing said received message in the buffer identified in the associated handle for the received message.

20. The computer program product of claim 17 wherein said queue manager includes computer readable program code means for dequeueing the next thread-specific structure using a First-In-First-Out policy.

21. The computer program product of claim 17 wherein said queue manager includes computer readable program code means for dequeueing the next thread-specific structure using a Last-In-First-Out policy.

22. The computer program product of claim 17 wherein said queue manager includes computer readable program code means for dequeueing the next thread-specific structure based on a priority value contained in said structure.

23. The computer program product of claim 17 further comprising computer readable program code means for obtaining a lock for the handle associated with said received message such that the awakened thread may process only the received message.

24. The computer program product of claim 23 further comprising computer readable program code means for releasing said lock after said awakened thread has processed said received message such that said awakened thread may continue with other work.

25. An apparatus for efficiently dispatching threads awaiting messages in a multi-threaded communication library comprising:

means for preassigning threads to messages to be received;

means for putting to sleep, those threads whose assigned messages have not been received;

means for, upon receipt of a message, awakening its preassigned thread; and executing said awakened thread which processes the received message and tests to see if any other threads are ready to run.

26. The apparatus of claim 25 wherein the selection of the thread to be dispatched is based on its priority as set when the thread is put to sleep.

27. The apparatus of claim 25 wherein said means for preassigning threads comprises:

means for creating a thread-specific structure for each thread, each thread-specific structure having a ready flag and a condition variable unique to its preassigned thread;

means for creating a handle for each message to be received; and means for having a thread invoke message passing logic for a particular handle, thereby associating the thread and the message.

28. The apparatus of claim 27 wherein said means for putting to sleep comprises:

means for enqueing for a received message, a preassigned thread-specific structure into a first queue;

means for writing into said handle associated with the message received, an identification of said thread-specific structure enqued for the received message, and means for placing said thread-specific structure for the received message in the WAIT condition.

29. The apparatus of claim 28 wherein said means for awakening comprises;

means for completing said received message;

means for changing the condition of the thread-specific structure for the completed received structure to the READY condition; and means for dequeueing with a queue manager, the next thread-specific structure in said first queue in the READY condition and sending its thread a thread awakening condition signal.

30. The apparatus of claim 29 further comprising;

means for allocating in said preassigning step, buffer space for storing messages to be received; and in said means for putting to sleep, means for identifying in said handle the buffer in which the message associated with the handle is to be stored when it is received.

31. The apparatus of claim 30 wherein said means for completing said received message comprises means for storing said received message in the buffer identified in the associated handle for the received message.

32. The apparatus of claim 29 wherein said queue manager includes means for dequeueing the next thread-specific structure using a First-In-First-Out policy.

33. The apparatus of claim 29 wherein said queue manager includes means for dequeueing the next thread-specific structure using a Last-In-First-Out policy.

34. The apparatus of claim 29 wherein said queue manager includes means for dequeueing the next thread-specific structure based on a priority value contained in said structure.

35. The apparatus of claim 29 further comprising means for obtaining a lock for the handle associated with said received message such that the awakened thread may process only the received message.

36. The apparatus of claim 35 further comprising means for releasing said lock after said awakened thread has processed said received message such that said awakened thread may continue with other work.

37. An apparatus comprising:

a data processing system;

a multi-threaded communication library in said data processing system;

a thread dispatcher in said data processing system for efficiently dispatching threads awaiting messages in said multi-threaded communication library;

computer code which preassigns threads to messages to be received;

computer code which puts to sleep those threads whose assigned messages have not been received;

computer code which, upon receipt of a message, awakens its preassigned thread; and computer code which executes said awakened thread, thereby processing the received message and testing to see if any other threads are ready to run.

38. The apparatus of claim 37 wherein the selection of the thread to be dispatched is based on its priority as set when the thread is put to sleep.

39. The apparatus of claim 37 wherein said computer code which preassigns threads comprises:

computer code which creates a thread-specific structure for each thread, each thread-specific structure having a ready flag and a condition variable unique to its preassigned thread;

computer code which creates a handle for each message to be received; and computer code which causes a thread invoke message passing logic for a particular handle, thereby associating the thread and the message.

40. The apparatus of claim 39 wherein said computer code which puts to sleep comprises:

computer code which enqueues for a received message, a preassigned thread-specific structure into a first queue;

computer code which writes into said handle associated with the message received, an identification of said thread-specific structure enqued for the received message, and computer code which places said thread-specific structure for the received message in the WAIT condition.

41. The apparatus of claim 40 wherein said computer code which awakens comprises;

computer code which completes said received message;

computer code which changes the condition of the thread-specific structure for the completed received structure to the READY condition; and computer code which dequeues with a queue manager, the next thread-specific structure in said first queue in the READY condition and sending its thread a thread awakening condition signal.

42. The apparatus of claim 41 further comprising;

in said computer code which preassigns, computer code which allocates buffer space for storing messages to be received; and in said computer code which puts to sleep, computer code which identifies in said handle the buffer in which the message associated with the handle is to be stored when it is received.

43. The apparatus of claim 42 wherein said computer code which completes said received message comprises computer code which stores said received message in the buffer identified in the associated handle for the received message.

44. The apparatus of claim 41 wherein said queue manager includes computer code which dequeues the next thread-specific structure using a First-In-First-Out policy.

45. The apparatus of claim 41 wherein said queue manager includes computer code which dequeues the next thread-specific structure using a Last-In-First-Out policy.

46. The apparatus of claim 41 wherein said queue manager includes computer code which dequeues the next thread-specific structure based on a priority value contained in said structure.

47. The apparatus of claim 41 further comprising computer code which obtains a lock for the handle associated with said received message such that the awakened thread may process only the received message.

48. The apparatus of claim 47 further comprising computer code which releases said lock after said awakened thread has processed said received message such that said awakened thread may continue with other work.

* * * * *